(12) United States Patent
Carter et al.

(10) Patent No.: US 10,818,162 B2
(45) Date of Patent: Oct. 27, 2020

(54) CALIBRATION TECHNIQUES IN HAPTIC SYSTEMS

(71) Applicant: Ultrahaptics IP Ltd, Bristol (GB)

(72) Inventors: Thomas Andrew Carter, Bristol (GB); Benjamin John Oliver Long, Bristol (GB); Robert Charles Blenkinsopp, Bristol (GB)

(73) Assignee: Ultrahaptics IP Ltd, Bristol (GB)

( * ) Notice: Subject to any disclaimer, the term of this patent is extended or adjusted under 35 U.S.C. 154(b) by 524 days.

(21) Appl. No.: 15/210,661

(22) Filed: Jul. 14, 2016

(65) Prior Publication Data

US 2017/0018171 A1    Jan. 19, 2017

Related U.S. Application Data

(60) Provisional application No. 62/193,180, filed on Jul. 16, 2015, provisional application No. 62/275,206, (Continued)

(51) Int. Cl.
  *H04B 3/36* (2006.01)
  *G08B 29/20* (2006.01)
  (Continued)

(52) U.S. Cl.
  CPC ............. *G08B 29/20* (2013.01); *G06F 3/016* (2013.01); *G06F 3/043* (2013.01); *G08B 6/00* (2013.01); *G10K 11/32* (2013.01); *G10K 11/34* (2013.01)

(58) Field of Classification Search
  CPC ......... G06F 3/016; G06F 3/043; G08B 29/20; G08B 6/00; G10K 11/32
  (Continued)

(56) References Cited

U.S. PATENT DOCUMENTS 4,218,921 A   8/1980  Oran et al.
4,771,205 A   9/1988  Mequio
           (Continued)

FOREIGN PATENT DOCUMENTS

CN   102591512   7/2012
CN   103797379   5/2014
           (Continued)

OTHER PUBLICATIONS

Search report and Written Opinion of ISA for PCT/GB2015/050417 dated Jul. 8, 2016.

(Continued)

*Primary Examiner* — Naomi J Small
(74) *Attorney, Agent, or Firm* — Koffsky Schwalb LLC; Mark I. Koffsky

(57) ABSTRACT

A system providing various improved calibration techniques for haptic feedback is described. An acoustic field is defined by one or more control points in a space within which the acoustic field may exist. Each control point is assigned an amplitude value equating to a desired amplitude of the acoustic field at the control point. Because complete control of space is not possible, controlling the acoustic field at given points yields erroneous local maxima in the acoustic field levels at other related positions. In relation to mid-air haptic feedback, these can interfere in interactions with the space by creating secondary effects and ghost phenomena that can be felt outside the interaction area. The level and nature of the secondary maxima in the acoustic field is determined by how the space is controlled. By arranging the transducer elements in different ways, unwanted effects on the acoustic field can be limited and controlled.

10 Claims, 14 Drawing Sheets

Related U.S. Application Data filed on Jan. 5, 2016, provisional application No. 62/275,030, filed on Jan. 5, 2016.

(51) Int. Cl.
| | | |
|---|---|---|
| *G06F 3/01* | (2006.01) | |
| *G06F 3/043* | (2006.01) | |
| *G10K 11/32* | (2006.01) | |
| *G10K 11/34* | (2006.01) | |
| *G08B 6/00* | (2006.01) | |

(58) Field of Classification Search
USPC .................................................. 340/407.1
See application file for complete search history.

(56) References Cited

U.S. PATENT DOCUMENTS

| | | | |
|---|---|---|---|
| 4,881,212 A | 11/1989 | Takeuchi | |
| 5,329,682 A | 7/1994 | Thurn | |
| 5,426,388 A | 6/1995 | Flora et al. | |
| 5,511,296 A | 4/1996 | Dias | |
| 6,503,204 B1 | 1/2003 | Sumanaweera et al. | |
| 6,647,359 B1 | 11/2003 | Verplank | |
| 6,772,490 B2 | 8/2004 | Toda | |
| 6,800,987 B2 | 10/2004 | Toda | |
| 7,109,789 B2 | 9/2006 | Spencer | |
| 7,225,404 B1 | 5/2007 | Zilles et al. | |
| 8,269,168 B1 | 9/2012 | Axelrod | |
| 8,279,193 B1 | 10/2012 | Birnbaum | |
| 8,607,922 B1 | 12/2013 | Werner | |
| 8,833,510 B2 | 9/2014 | Koh | |
| 8,884,927 B1 | 11/2014 | Cheatham, III | |
| 9,208,664 B1 | 12/2015 | Peters et al. | |
| 9,612,658 B2 | 4/2017 | Subramanian | |
| 9,662,680 B2 | 5/2017 | Yamamoto | |
| 9,841,819 B2 | 12/2017 | Carter et al. | |
| 9,945,818 B2 | 4/2018 | Ganti | |
| 10,101,811 B2 | 10/2018 | Carter | |
| 2002/0149570 A1 | 10/2002 | Knowles | |
| 2003/0024317 A1 | 2/2003 | Miller | |
| 2003/0144032 A1 | 7/2003 | Brunner et al. | |
| 2004/0014434 A1 | 1/2004 | Haardt | |
| 2004/0091119 A1 | 5/2004 | Duraiswami et al. | |
| 2004/0226378 A1 | 11/2004 | Oda | |
| 2004/0264707 A1 | 12/2004 | Yang | |
| 2005/0212760 A1 | 9/2005 | Marvit | |
| 2006/0085049 A1 | 4/2006 | Cory et al. | |
| 2006/0090955 A1* | 5/2006 | Cardas | H04R 7/00 |
| | | | 181/158 |
| 2006/0091301 A1* | 5/2006 | Trisnadi | G06F 3/0317 |
| | | | 250/226 |
| 2007/0177681 A1 | 8/2007 | Choi et al. | |
| 2008/0012647 A1 | 1/2008 | Risbo et al. | |
| 2008/0273723 A1 | 11/2008 | Hartung et al. | |
| 2008/0300055 A1 | 12/2008 | Lutnick | |
| 2009/0093724 A1 | 4/2009 | Pernot et al. | |
| 2010/0013613 A1 | 1/2010 | Weston | |
| 2010/0085168 A1 | 4/2010 | Kyung | |
| 2010/0103246 A1 | 4/2010 | Schwerdtner | |
| 2010/0109481 A1 | 5/2010 | Buccafusca | |
| 2010/0262008 A1 | 10/2010 | Roundhill | |
| 2011/0051554 A1 | 3/2011 | Varray et al. | |
| 2011/0199342 A1 | 8/2011 | Vartanian et al. | |
| 2011/0310028 A1 | 12/2011 | Camp, Jr. | |
| 2012/0063628 A1 | 3/2012 | Rizzello | |
| 2012/0223880 A1 | 9/2012 | Birnbaum | |
| 2012/0229400 A1* | 9/2012 | Birnbaum | G06F 3/0488 |
| | | | 345/173 |
| 2012/0229401 A1 | 9/2012 | Birnbaum et al. | |
| 2012/0236689 A1* | 9/2012 | Brown | G10K 11/008 |
| | | | 367/118 |
| 2012/0299853 A1 | 11/2012 | Dagar | |
| 2012/0307649 A1 | 12/2012 | Park et al. | |
| 2012/0315605 A1 | 12/2012 | Cho | |
| 2013/0035582 A1 | 2/2013 | Radulescu | |
| 2013/0094678 A1* | 4/2013 | Scholte | H04R 19/016 |
| | | | 381/182 |
| 2013/0100008 A1 | 4/2013 | Marti | |
| 2013/0101141 A1* | 4/2013 | McElveen | H04S 3/002 |
| | | | 381/123 |
| 2014/0027201 A1 | 1/2014 | Islam | |
| 2014/0168091 A1 | 6/2014 | Jones | |
| 2014/0265572 A1 | 9/2014 | Siedenburg | |
| 2015/0002477 A1 | 1/2015 | Cheatham, III | |
| 2015/0007025 A1 | 1/2015 | Sassi | |
| 2015/0006645 A1 | 3/2015 | Lin et al. | |
| 2015/0066445 A1 | 3/2015 | Lin | |
| 2015/0070147 A1 | 3/2015 | Cruz-Hernandez et al. | |
| 2015/0070245 A1 | 3/2015 | Han et al. | |
| 2015/0110310 A1 | 4/2015 | Minnaar | |
| 2015/0013023 A1 | 5/2015 | Harris et al. | |
| 2015/0130323 A1 | 5/2015 | Harris | |
| 2015/0168205 A1 | 6/2015 | Lee | |
| 2015/0192995 A1 | 7/2015 | Subramanian et al. | |
| 2015/0220199 A1 | 8/2015 | Wang | |
| 2015/0226537 A1 | 8/2015 | Schorre | |
| 2015/0226831 A1 | 8/2015 | Nakamura et al. | |
| 2015/0248787 A1 | 9/2015 | Abovitz | |
| 2015/0277610 A1* | 10/2015 | Kim | G06F 3/016 |
| | | | 345/173 |
| 2015/0304789 A1 | 10/2015 | Babyoff | |
| 2016/0019879 A1 | 1/2016 | Daley | |
| 2016/0044417 A1 | 2/2016 | Clemen | |
| 2016/0124080 A1 | 5/2016 | Carter | |
| 2016/0189702 A1 | 6/2016 | Blanc et al. | |
| 2016/0242724 A1 | 8/2016 | Lavallee | |
| 2016/0246374 A1 | 8/2016 | Carter | |
| 2016/0249150 A1 | 8/2016 | Carter et al. | |
| 2016/0320843 A1 | 11/2016 | Long | |
| 2017/0004819 A1* | 1/2017 | Ochiai | G10K 11/346 |
| 2017/0018171 A1 | 1/2017 | Carter | |
| 2017/0123499 A1* | 5/2017 | Eid | G10K 15/00 |
| 2017/0193768 A1 | 7/2017 | Long | |
| 2017/0193823 A1 | 7/2017 | Jiang | |
| 2018/0039333 A1 | 2/2018 | Carter | |
| 2018/0304310 A1 | 10/2018 | Long | |
| 2018/0361174 A1 | 12/2018 | Radulescu | |

FOREIGN PATENT DOCUMENTS

| | | |
|---|---|---|
| CN | 103984414 A | 8/2014 |
| EP | 1911530 A1 | 4/2008 |
| GB | 2464117 | 4/2010 |
| GB | 2513884 | 11/2014 |
| GB | 2513884 A | 11/2014 |
| GB | 2530036 | 3/2016 |
| JP | 2010109579 | 5/2010 |
| JP | 2011172074 | 9/2011 |
| JP | 201248378 | 3/2012 |
| JP | 2016035646 | 3/2016 |
| KR | 20120065779 | 6/2012 |
| KR | 20130055972 | 5/2013 |
| KR | 20160008280 | 1/2016 |
| WO | 1991/18486 | 11/1991 |
| WO | 96/39754 | 12/1996 |
| WO | 2005/017965 | 2/2005 |
| WO | 2013/179179 | 12/2013 |
| WO | 2014181084 | 11/2014 |
| WO | 2015006467 | 1/2015 |
| WO | 2015/039622 | 3/2015 |
| WO | 2016007920 | 1/2016 |
| WO | 2016132141 A1 | 8/2016 |
| WO | 2016132144 | 8/2016 |
| WO | 2016132144 A1 | 8/2016 |
| WO | 2016137675 | 9/2016 |
| WO | 2016/162058 | 10/2016 |

OTHER PUBLICATIONS

Search report and Written Opinion of ISA for PCT/GB2015/050421 dated Jul. 8, 2016.

(56) References Cited

OTHER PUBLICATIONS

Martinez-Graullera et al., 2D array design based on Fermat spiral for ultrasonic imaging, Ultrasonics 50 (2010) 280-89.
Search Report for PCT/GB2017/050012 dated Jun. 8, 2017.
Pompei, F.J. (2002), "Sound from Ultrasound: The Parametric Array as an Audible Sound Source", Massachusetts Institute of Technology.
Hasegawa, K. and Shinoda, H. (2013) "Aerial Display of Vibrotactile Sensation with High Spatial-Temporal Resolution using Large Aperture Airbourne Ultrasound Phased Array", University of Tokyo.
Hoshi, T. et al. (2010), "Noncontrast Tactile Display Based on Radiation Pressure of Airbourne Ultrasound", IEEE Transactions on Haptics, vol. 3, No. 3.
Yoshino, K. and Shinoda, H. (2013), "Visio Acoustic Screen for Contactless Touch Interface with Tactile Sensation", University of Tokyo.
Kamakura, T. and Aoki, K. (2006) "A Highly Directional Audio System using a Parametric Array in Air" WESPAC IX 2006.
Alexander, J. et al. (2011), "Adding Haptic Feedback to Mobile TV".
Carter, T. et al. (2013) "Ultrahaptics: Multi-point Mid-Air Haptic Feedback for Touch Surfaces" UIST.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Search Report for GB1308274.8 dated Nov. 11, 2013.
Search Report for PCT/GB2014/051319 dated Jul. 28, 2014.
Gavrilov L R Et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Mingzhu Lu et al. (2006) Design and experiment of 256-element ultrasound phased array for noninvasive focused Ultrasound surgery, Ultrasonics, vol. 44, Supplement, Dec. 22, 2006, pp. e325-e330.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Iwamoto et al. (2006), Two-dimensional Scanning Tactile Display using Ultrasonic Radiation Pressure, Symposium of Haptic Interfaces for Virtual Environment and Teleoperator Systems, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015.
IPRP for PCT/GB2014/051319 dated Nov. 10, 2015.
Search Report for GB1415923.0 dated Mar. 11, 2015.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems. (pp. 2185-2188).
Obrist et al., Talking about Tactile Experiences, CHI 2013, Apr. 27-May 2, 2013.
Freeman et al., Tactile Feedback for Above-Device Gesture Interfaces: Adding Touch to Touchless Interactions ICMI'14, Nov. 12-16, 2014, Istanbul, Turkey.
Obrist et al., Emotions Mediated Through Mid-Air Haptics, CHI 2015, Apr. 18-23, 2015, Seoul, Republic of Korea.
Wilson et al., Perception of Ultrasonic Haptic Feedback on the Hand: Localisation and Apparent Motion, CHI 2014, Apr. 26-May 1, 2014, Toronto, Ontario, Canada.
Phys.org, Touchable Hologram Becomes Reality, Aug. 6, 2009, by Lisa Zyga.
Iwamoto et al., Airborne Ultrasound Tactile Display: Supplement, The University of Tokyo 2008.
Hoshi, T., Development of Aerial-Input and Aerial-Tactile-Feedback System, IEEE World Haptics Conference 2011, p. 569-573.
EPSRC Grant summary Ep/J004448/1 (2011).

Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Eurohaptics Conference and Symposium on Haptic Interfaces for Virtual Environment and Teleoperator Systems 2009.
Light, E.D., Progress in Two Dimensional Arrays for Real Time Volumetric Imaging, 1998.
Casper et al., Realtime Control of Multiple-focus Phased Array Heating Patterns Based on Noninvasive Ultrasound Thermography, IEEE Trans Biomed Eng. Jan. 2012; 59(1): 95-105.
Hoshi, T., Touchable Holography, SIGGRAPH 2009, New Orleans, Louisiana, Aug. 3-7, 2009.
Marshall et al., Ultra-Tangibles: Creating Movable Tangible Objects on Interactive Tables, CHI'12, May 5-10, 2012, Austin, Texas.
Marzo et al., Holographic acoustic elements for manipulation of levitated objects, Nature Communications DOI: 10.1038/ncomms9661 (2015).
Search Report for PCT/GB2017/052332 dated Oct. 10, 2017.
A. Sand, Head-Mounted Display with Mid-Air Tactile Feedback, Proceedings of the 21st ACM Symposium on Virtual Reality Software and Technology, Nov. 13-15, 2015.
M. Toda, New Type of Matching Layer for Air-Coupled Ultrasonic Transducers, IEEE Transactions on Ultrasonics, Ferroelectrics, and Frequency Control, vol. 49, No. 7, Jul. 2002.
E. Bok, Metasurface for Water-to-Air Sound Transmission, Physical Review Letters 120, 044302 (2018).
Long et al. Rendering Volumetric Haptic Shapes in Mid-Air using Ultrasound, ACM Transactions on Graphics (Proceedings of SIGGRAPH Asia), vol. 33, No. 6, Article 181 (Nov. 2014).
Xin Cheng et al., Computation of the Aoustic Radiation Force on a Sphere Based on the 3-D FDTD Method, IEEE Symposium 2010.
K. Jia, Dynamic properties of micro-particles in ultrasonic transportation using phase-controlled standing waves, J. Applied Physics 116, n. 16 (2014).
Yang Ling, Phase-coded approach for controllable generation of acoustical vortices, J. Applied Physics 113, No. 15 (2013).
M. Barmatz, Acoustic radiation potential on a sphere in plane, cylindrical, and spherical standing wave of fields, J. Acoustical Socirty, 77 No. 3 (1985).
M. A.B. Andrade, Matrix method for acoustic levitation simulation, IEEE Transactions on Ultrasonics Ferroelectrics and Frequency Control, 58 n. 8 (2011).
Search Report for PCT/GB/2017/053729 dated Mar. 15, 2018.
Search Report for PCT/GB/2017/053880 dated Mar. 21, 2018.
"Welcome to Project Soli" video, https://atap.google.com/#project-soli Accessed Nov. 30, 2018, 2 pages.
Colgan, A., "How Does the Leap Motion Controller Work?" Leap Motion, Aug. 9, 2014, 10 pages.
Damn Geeky, "Virtual projection keyboard technology with haptic feedback on palm of your hand," May 30, 2013, 4 pages.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
EPO Office Action for EP16708440.9 dated Sep. 12, 2018 (7 pages).
Ex Parte Quayle Action dated Dec. 28, 2018 for U.S. Appl. No. 15/966,213 (pp. 1-7).
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Iddan, et al., "3D Imaging in the Studio (and Elsewhwere . . . " Apr. 2001, 3DV systems Ltd., Yokneam, Isreal, www.3dvsystems.com.il, 9 pages.
International Preliminary Report on Patentability and Written Opinion issued in corresponding PCT/US2017/035009, dated Dec. 4, 2018, 8 pages.

(56) References Cited

OTHER PUBLICATIONS

International Preliminary Report on Patentability for Application No. PCT/EP2017/069569 dated Feb. 5, 2019, 11 pages.
Japanese Office Action (with English language translation) for Application No. 2017-514569, dated Mar. 31, 3019, 10 pages.
Kolb, et al., "Time-of-Flight Cameras in Computer Graphics," Computer Graphics forum, vol. 29 (2010), No. 1, pp. 141-159.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Li, Larry, "Time-of-Flight Camera—An Introduction," Texas Instruments, Technical White Paper, SLOA190B—Jan. 2014 Revised May 2014, 10 pages.
Meijster, A., et al., "A General Algorithm for Computing Distance Transforms in Linear Time," Mathematical Morphology and its Applications to Image and Signal Processing, 2002, pp. 331-340.
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 7, 2019 for U.S. Appl. No. 15/851,214 (pp. 1-7).
Notice of Allowance dated May 30, 2019 for U.S. Appl. No. 15/966,213 (pp. 1-9).
Office Action dated Apr. 18, 2019 for U.S. Appl. No. 16/296,127 (pp. 1-6).
Office Action dated Apr. 4, 2019 for U.S. Appl. No. 15/897,804 (pp. 1-10).
Office Action dated Feb. 20, 2019 for U.S. Appl. No. 15/623,516 (pp. 1-8).
Office Action dated May 16, 2019 for U.S. Appl. No. 15/396,851 (pp. 1-7).
PCT Partial International Search Report for Application No. PCT/GB2018/053404 dated Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Schmidt, Ralph, "Multiple Emitter Location and Signal Parameter Estimation" IEEE Transactions of Antenna and Propagation, vol. AP-34, No. 3, Mar. 1986, pp. 276-280.
Search report for PCT/GB2018/051061 dated Sep. 26, 2018 (17 pages).
Search report for PCT/US2018/028966 dated Jul. 13, 2018 (43 pages).
Sixth Sense webpage, http://www.pranavmistry.com/projects/sixthsense/ Accessed Nov. 30, 2018, 7 pages.
Steve Guest et al., "Audiotactile interactions in roughness perception", Exp. Brain Res (2002) 146:161-171, DOI 10.1007/s00221-002-1164-z, Accepted: May 16, 2002/ Published online: Jul. 26, 2002, Springer-Verlag 2002, (11 pages).
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Teixeira, et al., "A brief introduction to Microsoft's Kinect Sensor," Kinect, 26 pages., retrieved Nov. 2018.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Zeng, Wejun, "Microsoft Kinect Sensor and Its Effect," IEEE Multimedia, Apr.-Jun. 2012, 7 pages.
Corrected Notice of Allowability dated Oct. 31, 2019 for U.S. Appl. No. 15/623,516 (pp. 1-2).
Extended European Search Report for Application No. EP19169929.7, dated Aug. 6, 2019, 7 pages.
International Search Report and Written Opinion for Application No. PCT/GB2019/050969, dated Jun. 13, 2019, 15 pages.
Office Action dated Aug. 22, 2019 for U.S. Appl. No. 16/160,862 (pp. 1-5).
Office Action dated Oct. 17, 2019 for U.S. Appl. No. 15/897,804 (pp. 1-10).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Corrected Notice of Allowability dated Jun. 21, 2019 for U.S. Appl. No. 15/966,213 (2 pages).
International Search Report and Written Opinion for Application No. PCT/GB2018/053739, dated Jun. 4, 2019, 16 pages.
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Office Action dated Jul. 26, 2019 for U.S. Appl. No. 16/159,695 (pp. 1-8).

* cited by examiner

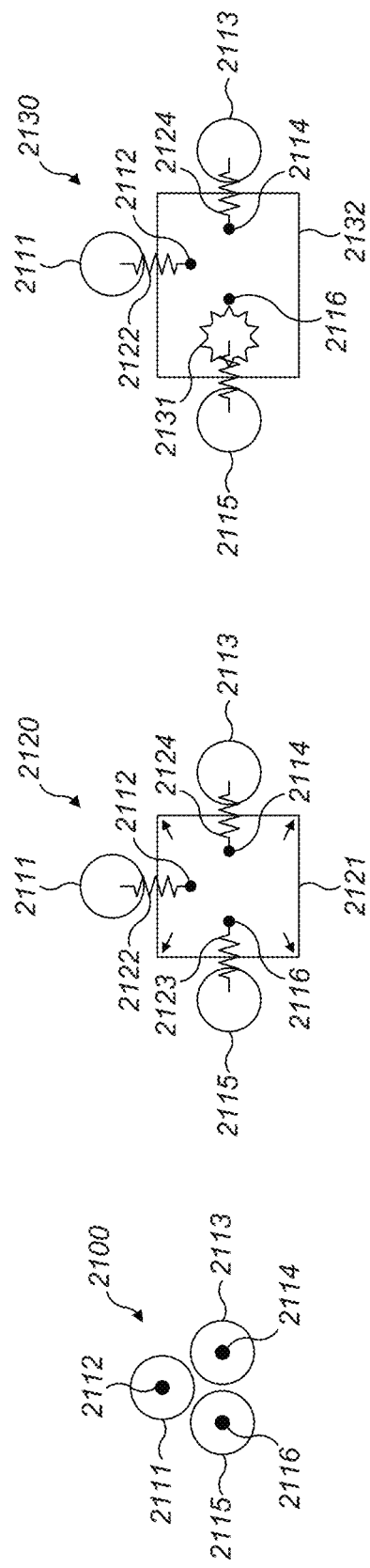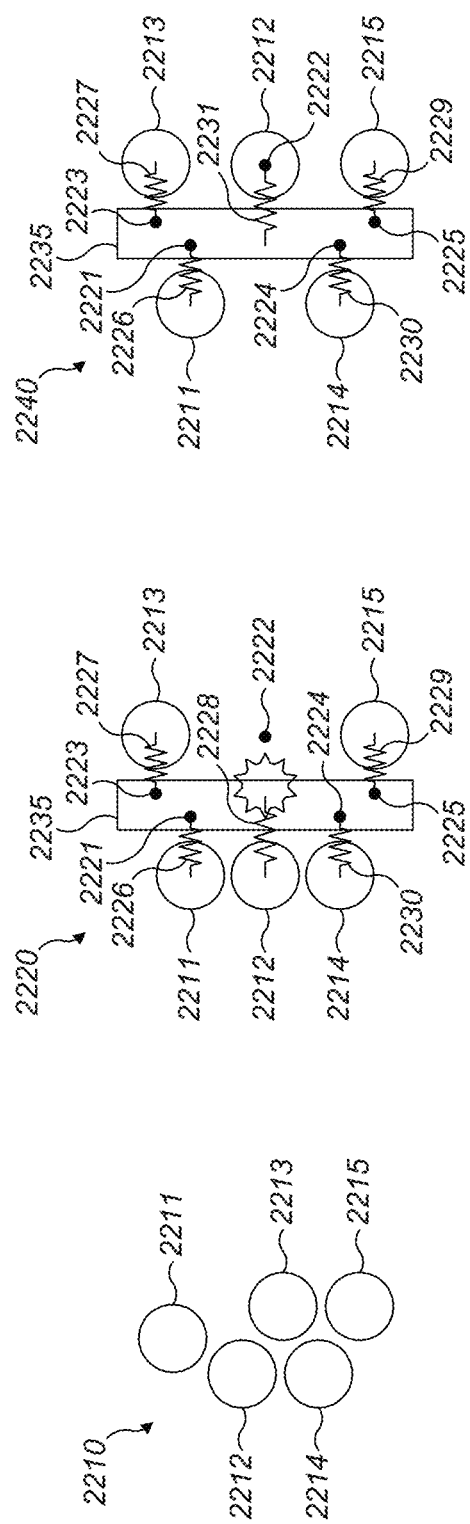
FIG. 21
FIG. 22

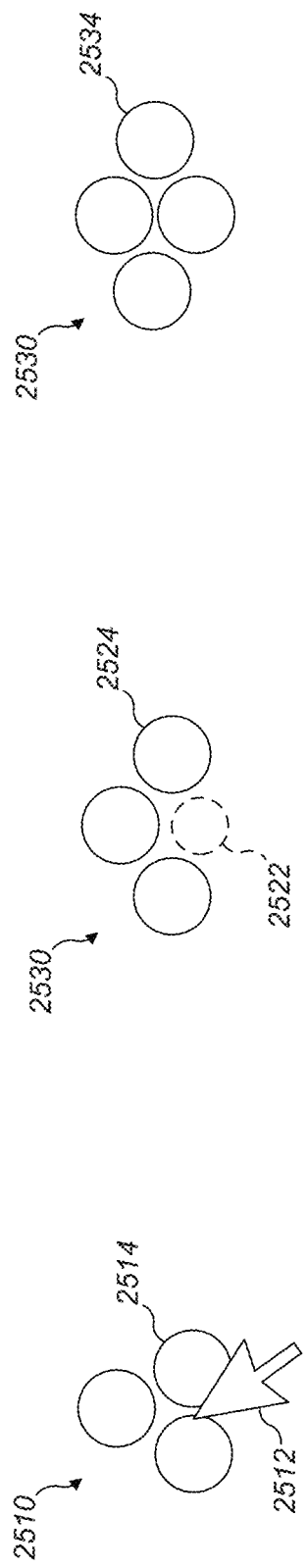
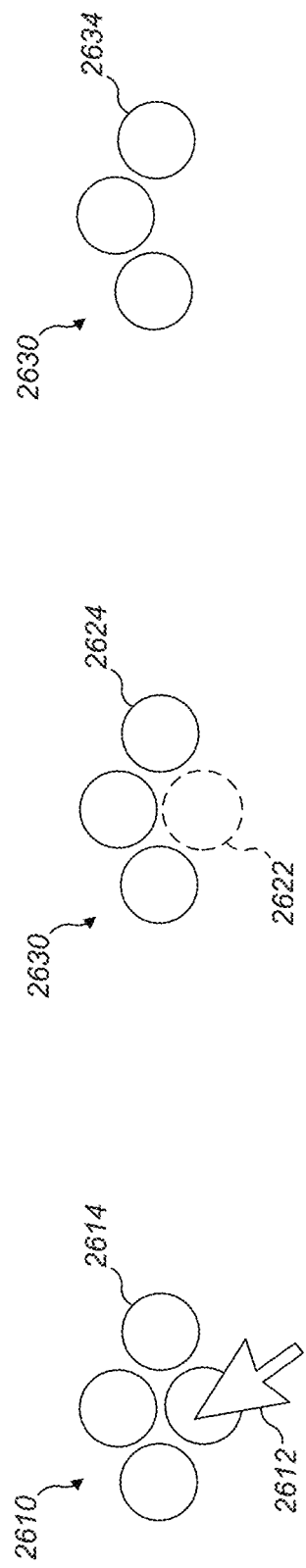
FIG. 25
FIG. 26

CALIBRATION TECHNIQUES IN HAPTIC SYSTEMS

RELATED APPLICATION

This application claims the benefit of the following three U.S. Provisional Patent Applications, all of which are incorporated by reference in their entirety:
1. Ser. No. 62/193,180, filed on Jul. 16, 2015.
2. Ser. No. 62/275,206, filed on Jan. 5, 2016.
3. Ser. No. 62/275,030, filed on Jan. 5, 2016.

FIELD OF THE DISCLOSURE

The present disclosure relates generally to improved calibration techniques for haptic-based systems.

BACKGROUND

A continuous distribution of sound energy, referred to as an "acoustic field", may be used for a range of applications including haptic feedback in mid-air.

By defining one or more control points in space, the acoustic field can be controlled. Each point can be assigned a value equating to a desired amplitude at the control point. A physical two-dimensional array of transducers can then be controlled to create an acoustic field exhibiting the desired amplitude at the control points.

However, because complete control of space is not possible, controlling the acoustic field at given points yields erroneous local maxima in the acoustic field levels at other related positions. In relation to mid-air haptic feedback, these can interfere in interactions with the space by creating secondary effects and ghost phenomena that can be felt outside the interaction area. The level and nature of the secondary maxima in the acoustic field is determined by how the space is controlled. One of the ways to change how the space is controlled is by rearranging the transducer elements. By arranging the two-dimensional array of transducer elements in different ways, unwanted effects on the acoustic field can be limited and controlled.

How to best approach designing an array of transducers that generates control points in an acoustic field with the minimum of erroneous maxima is not trivial.

Further, in prior applications, transducer layouts that minimize the formation of these erroneous maxima were described. In reality, however, due to physical manufacturing and production constraints inherent in the process of electronic design and layout these ideal configurations are often not achievable. As a result, a method to create configurations that maintain the required beneficial properties of the ideal physical arrangement while accounting for such design limitations is needed. Although this process could be performed manually this would be time consuming and prone to human error and as such an automated approach would be preferable.

Finally, in order to create an appropriate acoustic field that responds to input, a sensor must be attached to the system. This sensor is required for interaction, but the correspondence between the coordinate space of the acoustic field and the coordinate space of the sensor, must be established first. A human can perform this initial calibration step, by actuating the device, prompting for a corresponding behavior and then measuring the output of the sensor in this situation. This provides the correspondence between the two vector spaces. However, this requires human interaction and so is subject to human error, as well as requiring human intervention in a more general sense.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 21-26 show various embodiments of physical simulation systems configured to yield metaphors for constraints in transducer layout in haptic systems.

Figure 1:
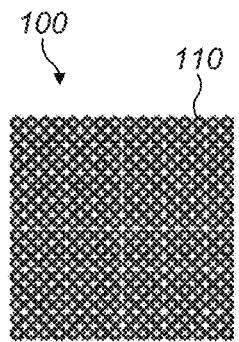
FIG. 1 shows transducers arranged in a rectilinear array.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Described herein are certain techniques to enhance calibration techniques in haptic systems. Some or all of these techniques may be used at the same time or one after the other in order to improve such calibration.

I. ARRAY CONFIGURATIONS TO REDUCE SECONDARY MAXIMA

An acoustic field may be controlled by defining one or more control points in space. Each control point can be assigned a value equating to a desired amplitude at that control point. A physical set of transducers may then be controlled to create an acoustic field exhibiting the desired amplitude at the control points.

Because complete control of space is not possible, controlling the acoustic field at given points may yield erroneous local maxima in the acoustic field levels at other related positions. In relation to mid-air haptic feedback, these can interfere in interactions with the space by creating secondary effects and ghost phenomena that can be felt outside the interaction area.

The level and nature of the secondary maxima in the acoustic field is determined by how the space is controlled. One of the ways to change how the space is controlled is by rearranging the transducer elements. By arranging the transducer elements in different ways, unwanted effects on the acoustic field can be limited and controlled.

How to best approach designing an array of transducers that generates control points in an acoustic field with the minimum of erroneous maxima is not trivial. Existing array geometries will be reviewed to consider their drawbacks. New array geometries will then be reviewed to remedy these drawbacks.

1. Figure Definitions

FIGS. 2, 4, 6, 8, 10, 12, 14, 16, 17 and 18 are simulations of a star shape made of 30 control points. The star shape is created on a plane 15 cm above the center of each transducer array and has a diameter of 14 cm. Each pixel is 1 mm². Similar results may occur with other sets of control points, pixels and transducer arrays.

2. Existing Array Configurations

Figure 2:
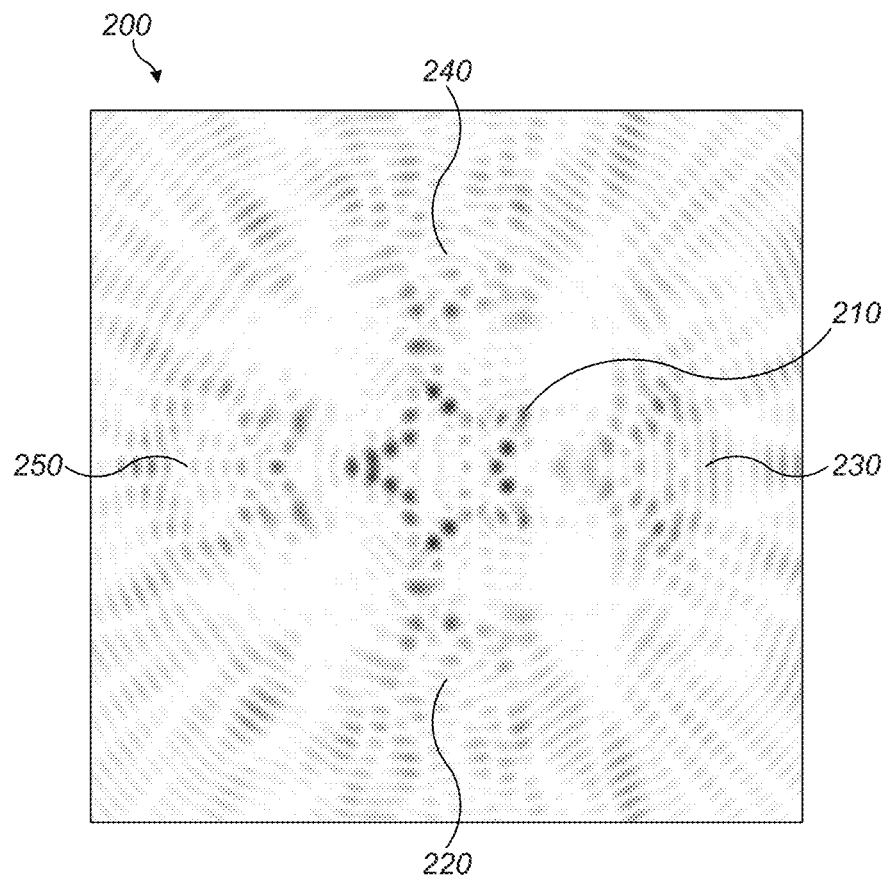
FIG. 2 shows the results of a rectilinear array simulation.

FIG. 1 shows the most obvious array 100 of 256 transducers to produce in order to control an acoustic field: the rectilinear array 110. This configuration is easy to model and to manufacture. As shown in FIG. 2, this rectilinear array simulation 200 suffers from Fourier transform-based ghost images 220, 230, 240, 250 reflecting the true image 210. This is due to the transducer arrangement being close to a truncated regular sampling of a plane surface.

Figure 3:
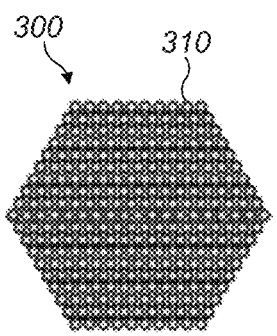
FIG. 3 shows transducers arranged in a hexagonal array.

Since the rectilinear structure is the source of these four ghost images 220 230 240 250, a potential solution is to break up the rectilinear structure. As shown in FIG. 3, a simple approach for an array 300 without rectilinear structure and better packing density of transducers may be obtained by being packed in a hexagon array 310.

Figure 4:
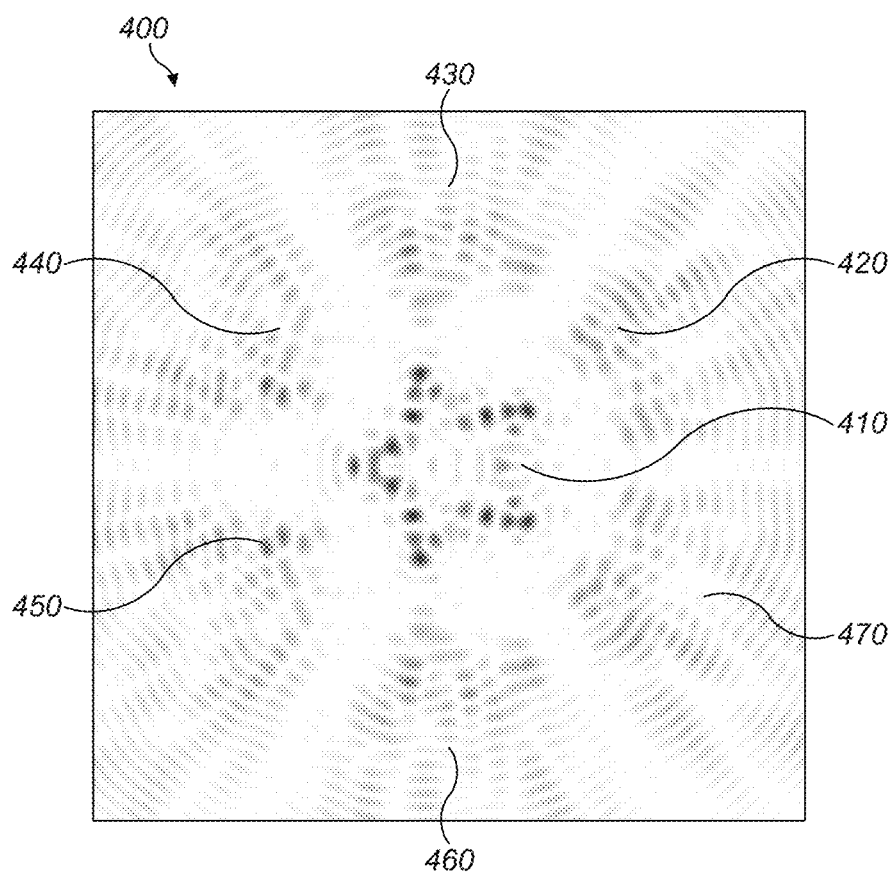
FIG. 4 shows the results of a hexagonal array simulation.

As shown by the hexagonal array simulation 400 in FIG. 4, the hexagon array 310 (here consisting of 271 transducers instead of 256) creates six ghost images 420, 430, 440, 450, 460, 470 around the intended pattern 410. These ghost images are visibly parts of translated copies of the pattern, in much the same fashion as was evident in the rectilinear matrix approach. Thus the repeated and uniform sampling of the plane along given—but not necessarily orthogonal—directions is to blame for this behavior.

Figure 5:
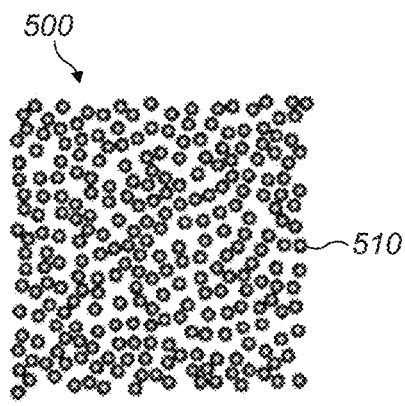
FIG. 5 shows transducers arranged in a random array.
Figure 6:
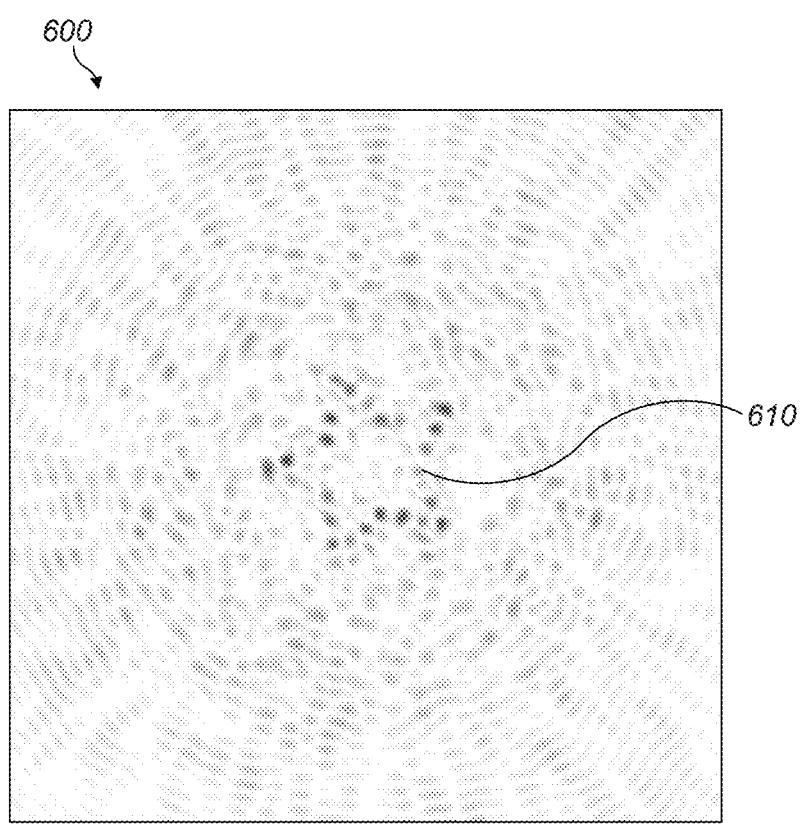
FIG. 6 shows the results of a random array simulation.

As shown in FIG. 5, to prevent these ghost images, it is possible to break up the uniform structure into an array 500 in which the transducer elements are positioned in a random configuration array 510. As shown in FIG. 6, the random array simulation 600 is effective in that there are no extra images beyond the intended image 610. Nevertheless, the packing of the transducer elements 510 is heavily compromised. This yields lower intensities at the control point foci as well as unpredictable variations in local transducer density. This results in fluctuations in acoustic field amplitudes and array efficiency for moving control points.

3. Phyllotactic Spiral Transducer Array

The issues outlined in the previous section necessitate the creation of a new type of array that has both uncorrelated secondary maxima that fall away from the control points and uniform density to avoid unexpected power fall off. A transducer arrangement that achieves both of these goals is desired with a geometry that has both uniform or predictable density and non-uniform sampling in any given direction to avoid ghost images.

The phyllotactic spiral pattern is common in nature where a dense packing of leaves to absorb the maximum amount of sunlight is needed. Its construction is based on angular proportions of the golden ratio (an irrational number) to produce alternating curved packing of elements that—while uniform and regular—can never result in a periodic sampling in any given direction. Two quantities are in the golden ratio (an irrational number, approximately 1.618) if their ratio is the same as the ratio of their sum to the larger of the two quantities.

Figure 7:
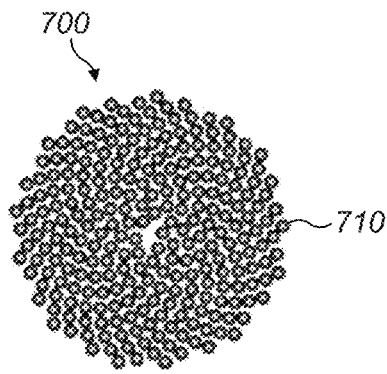
FIG. 7 shows transducers arranged in a phyllotactic spiral array.
Figure 8:
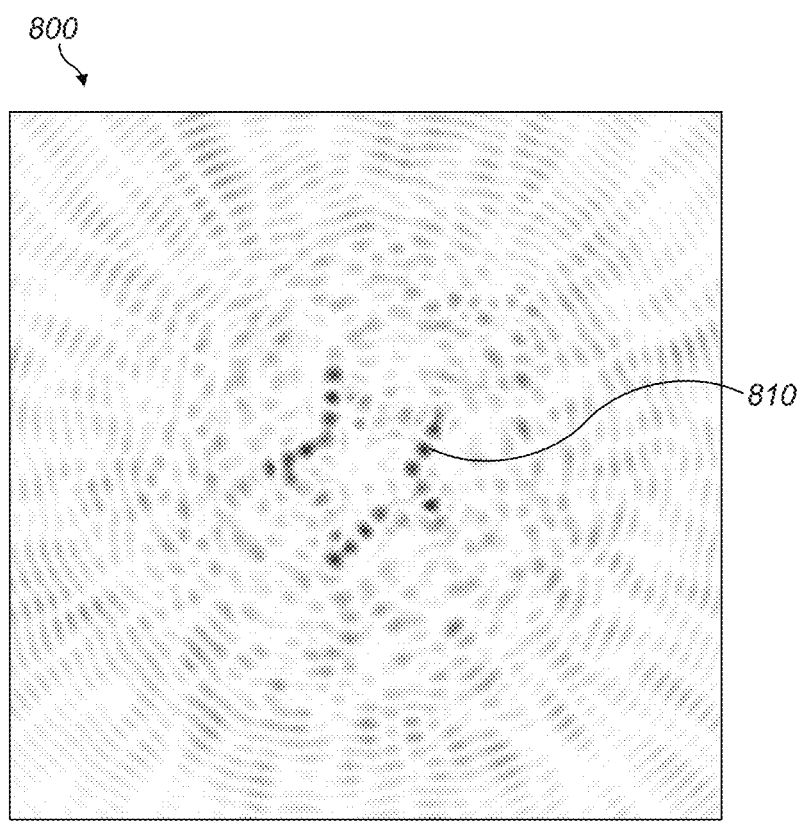
FIG. 8 shows the results of a phyllotactic spiral array simulation.

As shown in FIG. 7, an array 700 of transducer elements may arranged a variant of the phyllotactic spiral 710. As shown in FIG. 8, the phyllotactic spiral array simulation 800 removes ghost images beyond the intended image 810 and reduces secondary maxima by decorrelation.

Figure 9:
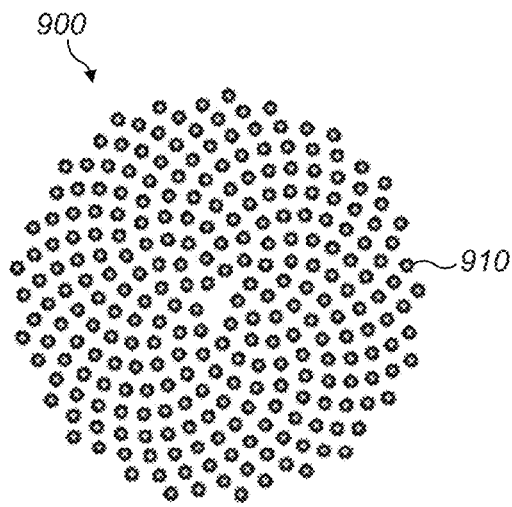
FIG. 9 shows transducers arranged in an expanded phyllotactic spiral array.
Figure 10:
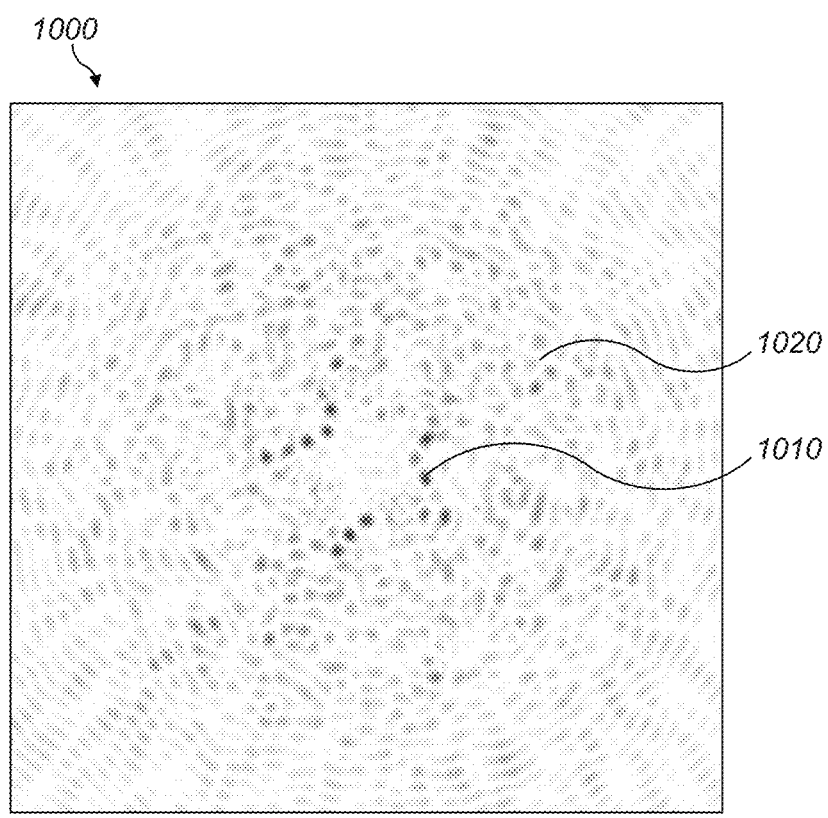
FIG. 10 shows the results of an expanded phyllotactic spiral array simulation.

As shown in FIG. 9, an array 900 of transducer elements may be arranged as an expanded phyllotactic spiral 910 with more coverage in space. As shown in FIG. 10, this expanded phyllotactic spiral array simulation 1000 results in an intended image 1010 with more de-correlated noise 1020 at an amplitude level close to the desired control point output.

The extra images in the regular array arrangements shown in FIGS. 2 and 4 are caused by collinear transducer elements that are repeated with a uniform separation. As a side effect, these elements in their collective action construct a discrete Fourier transform of the shape. This leads to the periodic boundary conditions where these collinear groupings terminate. The artifacts that manifest as a result of the periodic boundary conditions are the "ghost images" shown in those figures.

As shown, these images can be removed by creating a system wherein collinear groupings are minimized or there are no uniform separations. In these situations, the groupings do not have the same sampling approach as a discrete Fourier transform and so will not exhibit these effects. A random or Poisson disk sampling may be effective to eliminate these effects, but this has a downside of reducing the ability to pack the elements. Packing techniques that prevent uniform separation or collinearity are non-trivial as crystal structures in nature can attest. But the phyllotactic spiral design fulfills all these criteria by placing the transducer elements along curves that are constructed and governed by irrational numbers, minimizing the effects of collinearity.

Figure 11:
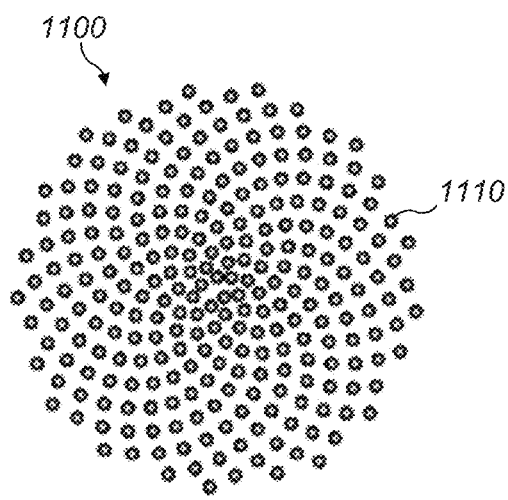
FIG. 11 shows transducers arranged in a golden ratio-based phyllotactic spiral array.
Figure 12:
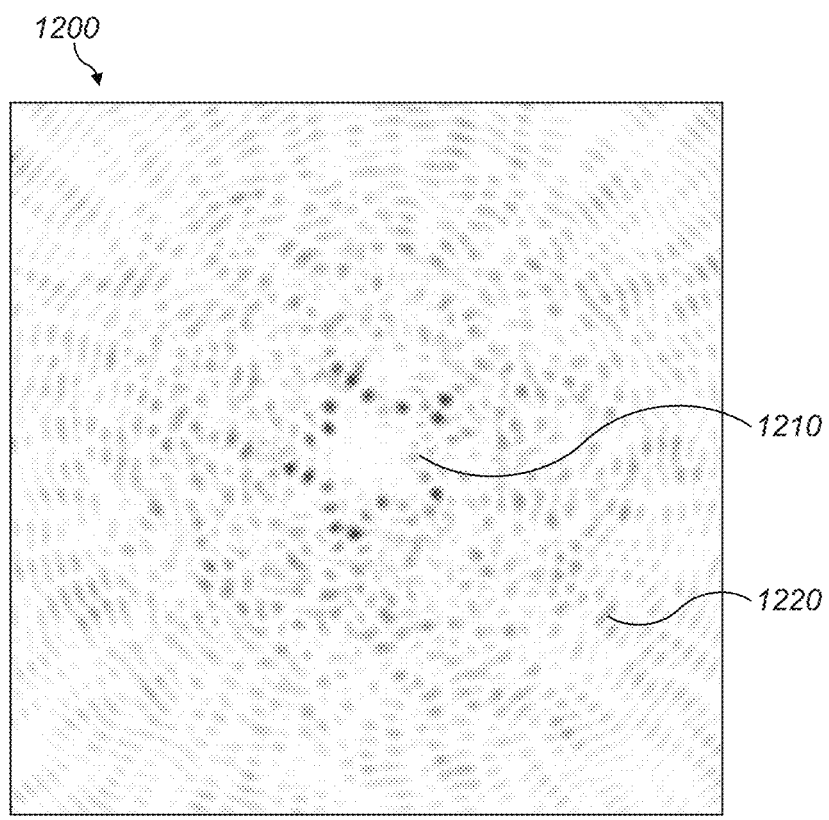
FIG. 12 shows the results of an expanded golden ratio-based spiral array simulation.

Instead of using a square root distance (raising by a power of 0.5) that distributes transducers equally in array area, the exponent may be increased (raising by a power of the golden ratio minus one, 0.618) to spread the transducers more towards the edges. As shown in FIG. 11, an array 1100 of transducer elements may be arranged as a golden ratio-based phyllotactic spiral 1110. As shown in FIG. 12, this golden ratio-based phyllotactic spiral array simulation 1200 results in an intended image 1210 with more de-correlated noise 1220 at an amplitude level close to the desired control point output. This suppresses noise more while controlling a larger area and degrades more gracefully towards the edge of the array.

By using the higher power in the exponent, the phyllotactic spiral relaxes the packing of the elements, making it more similar to the natural arrangement found in sunflowers. Here, the distribution of the transducers in a phyllotactic spiral pattern is sparser toward the edges of the phyllotactic spiral pattern. As the elements get further apart as they move away from the center, they may produce reduced haptic effects at the edge. However, these sparse transducers at the edge remain able to suppress excess noise, at the cost of a larger footprint and some extra transducers. This effect may justify the use of higher exponents in the production of the spiral.

The phyllotactic spiral array need not actually be in a complete spiral formation. The spiral may be cut into shapes that are more suitable for array footprints such as in a rectilinear, square or rectangle format. Thus one or more partial phyllotactic spiral patterns may be used to generate the desired effects. The use of the term "partial phyllotactic spiral pattern" herein may mean either a portion of a complete phyllotactic spiral pattern or a complete phyllotactic spiral pattern.

Figure 13:
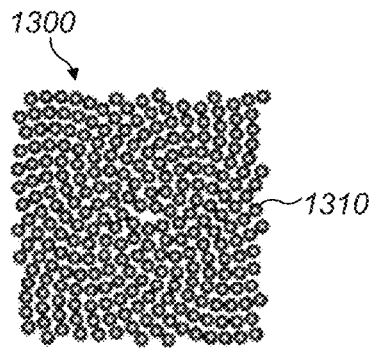
FIG. 13 shows transducers arranged in a phyllotactic spiral-based square format array.
Figure 14:
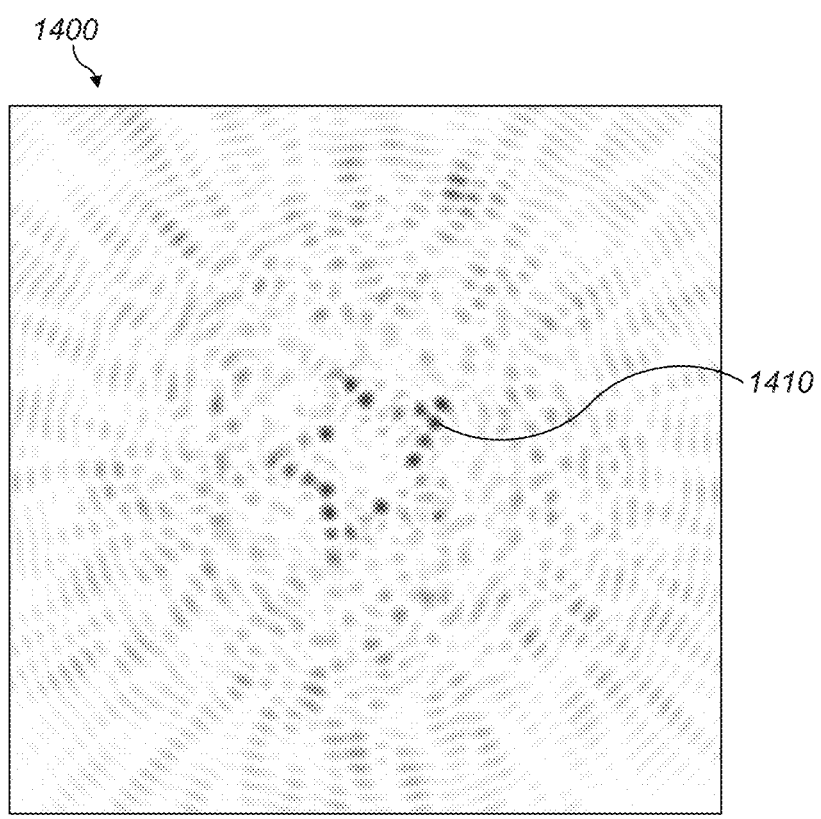
FIG. 14 shows the results of a phyllotactic spiral-based square format simulation.

As shown in FIG. 13, an array 1300 of transducer elements may be arranged as a phyllotactic spiral-based square format 1310. This array 1300 comprises transducer elements in multiple partial phyllotactic spiral patterns. As shown in FIG. 14, this phyllotactic spiral-based square format simulation 1400 results in an intended image 1410 with limited noise. A rectangular format may also be used.

Figure 15:
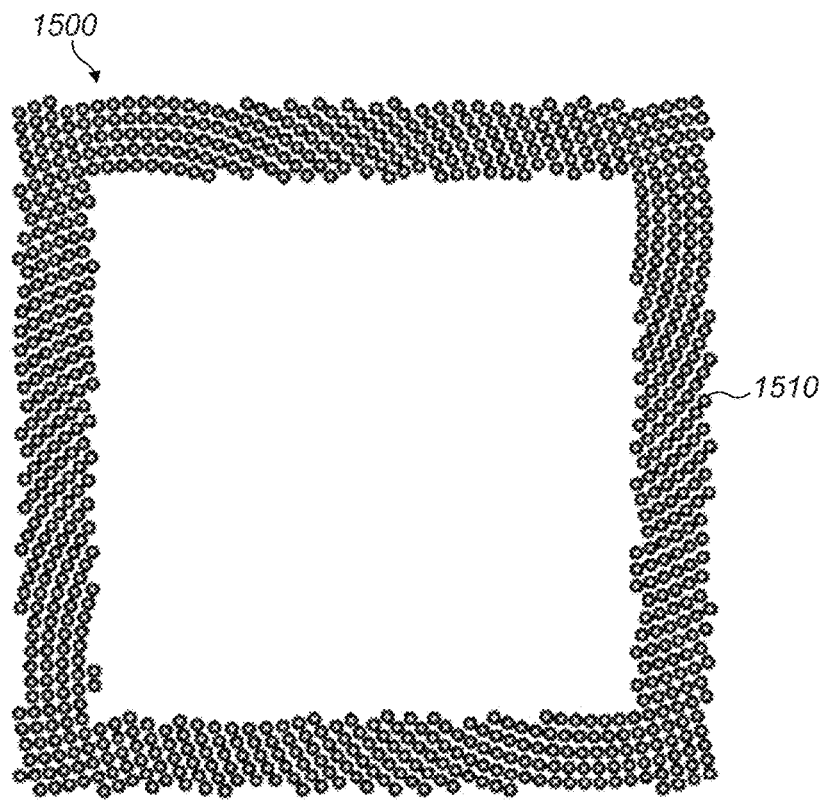
FIG. 15 shows transducers arranged in a phyllotactic spiral-based square frame array.
Figure 16:
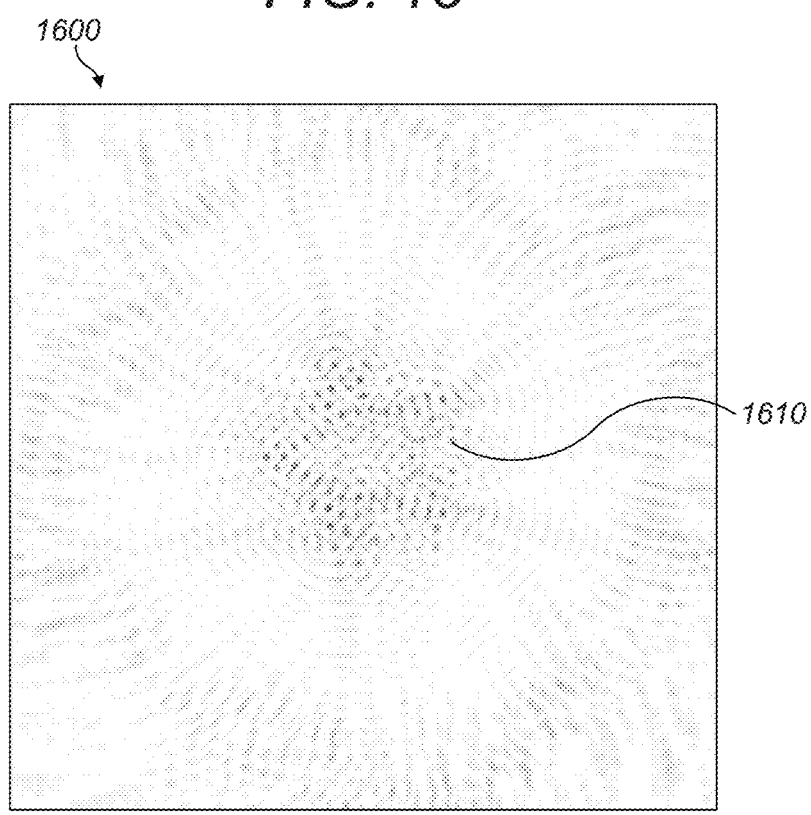
FIG. 16 shows the results of a phyllotactic spiral-based square frame array.
Figure 17:
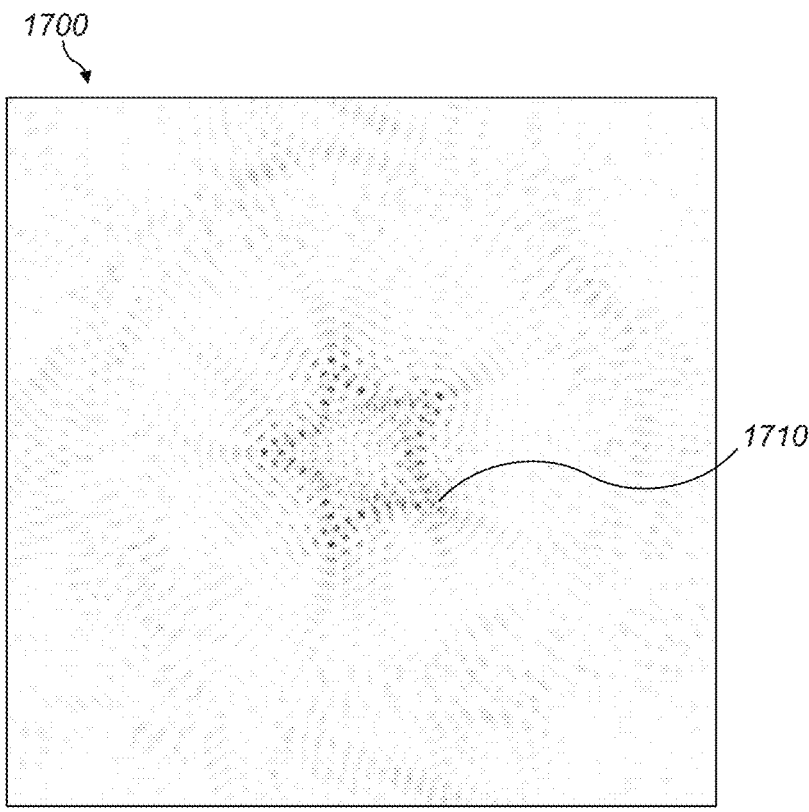
FIG. 17 shows the results of a phyllotactic spiral-based square frame array with the transducers rotated 45 degrees toward the center of the image.
Figure 18:
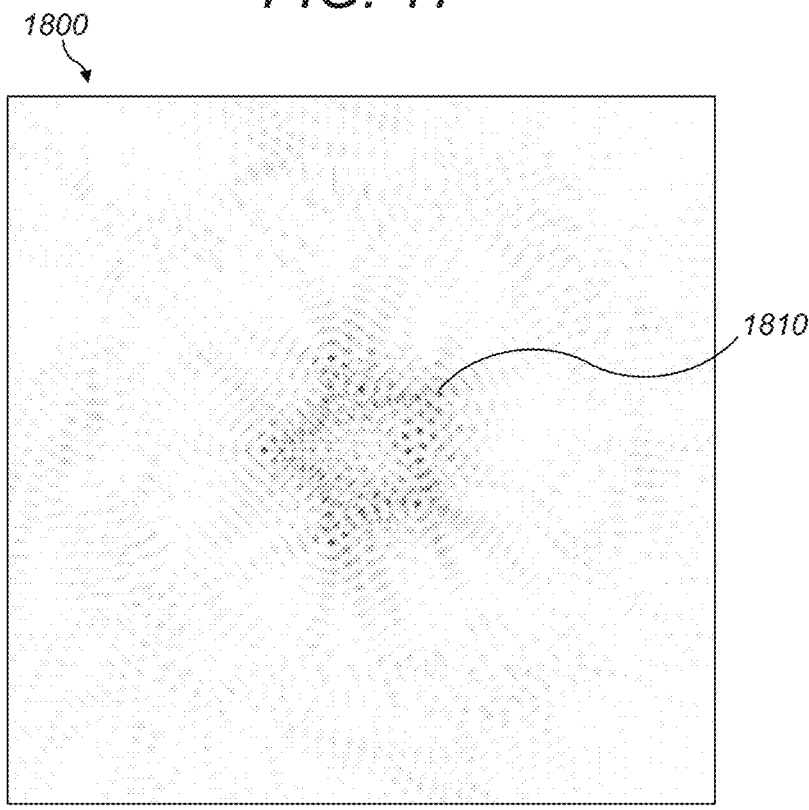
FIG. 18 shows the results of a phyllotactic spiral-based square frame array with the transducers pointing directly toward the center of the image.

Alternatively, the phyllotactic spiral may be cut into a frame for a device that gives mid-air haptic capabilities. As shown in FIG. 15, an array 1500 of transducer elements may be arranged as a phyllotactic spiral-based square frame format 1510. This array 1500 comprises transducer elements in multiple partial phyllotactic spiral patterns. This array 1500 used 800 transducers. As shown in FIG. 16, this phyllotactic spiral-based square frame simulation 1600 results in an intended image 1610 with low shape quality. This low shape quality can be attributed to a shallow angle of the control points that make up the shape.

Moving the transducers in the z-direction (the direction orthogonal to the two-dimensional transducer array) and rotating them 45 degrees into a beveled "picture frame" arrangement verifies this result. In the arrangement shown in FIG. 17, the simulation 1700 shows transducers are pointing at this 45-degree angle toward the center of the image. (Because the transducers are pointing in opposite directions on opposite sides of the image, the differential between transducers on opposite sides of the image is 90 degrees). Here the intended image 1710 is of very high quality with little noise. This pushes each transducer in the array closer to line of sight with the generated image, improving its ability to focus.

Counter-intuitively, rotating each transducer further to point directly at the center of the shape actually degrades focusing performance, as the lack of resolving power perpendicular to the four sides of the array creates more powerful secondary maxima in the plane of the shape. In the arrangement shown in FIG. 18, the simulation 1800 shows transducers are pointing directly toward the center of the image. Here the intended image 1810 includes significantly more noise.

The transducers need not all point in the same direction or be fixed at the same orientation in the z-axis.

While these transducer arrangements have been shown to use circular transducer elements the designs described are also applicable to differently shaped transducer elements, including square, rectangle or ellipse or other shapes.

4. Importance of Reduction and Decorrelation of Noise

Noise in the array output can cause a number of different phenomena. The first and most obvious side effect is that a high level of noise may interfere with the mid-air haptic qualities of the array. They may cause phantom points and low level stimulation that can drown out the intended signal. Another side effect is that since the array produces sound as a side effect, stronger random secondary maxima may result in more audible noise outside the working volume.

Reducing nearby secondary maxima will reduce the level of points of feedback that can interfere in the haptic sensation. De-correlating the noise with the feedback will smooth out noise more effectively by making it destructively interfere with itself spatially and temporally.

II. COMPUTATIONAL AUTOMATION OF TRANSDUCER PLACEMENT IN HAPTIC SYSTEMS

If the physical limitation of the placing of each electronic component is applied to the ideal layout by pruning transducers that are inappropriately placed, the design becomes sparse and inefficient.

1. Application of Physical Constraints

Figure 19:
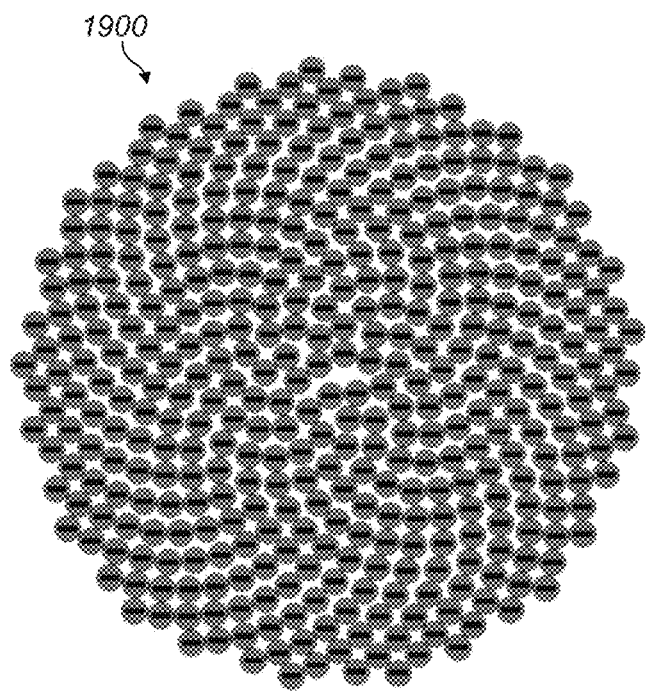
FIG. 19 shows an ideal layout of transducers in a phyllotactic spiral.
Figure 20:
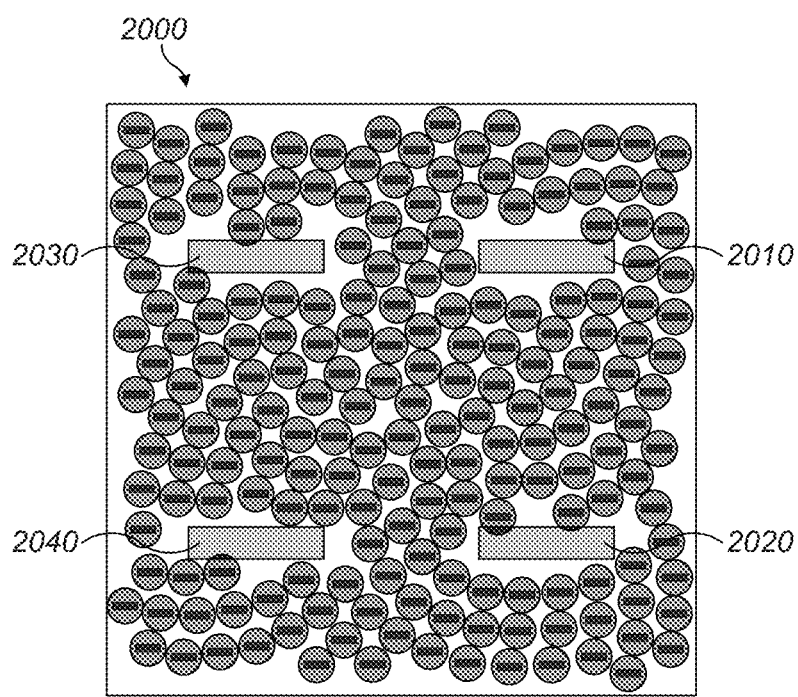
FIG. 20 shows an attempt to duplicate the layout of FIG. 19 in a real-world situation.

FIGS. 19 and 20 demonstrate the issues related to the ideal vs. real-world transducer layouts. FIG. 19 is the ideal layout of transducers 1900 in a phyllotactic spiral. FIG. 20 shows an attempt to duplicate this layout of transducers 2000 in a real-world situation.

Transducers must be contained within the footprint of the printed circuit board. FIG. 20 shows regions 2010, 2020, 2030, 2040 for four physical connector placements have been applied on top of the constraint for transducers. Thus in one example, the overall transducer count in FIG. 20 over the area of the board has dropped from 256 for a rectilinear layout (as in FIG. 1) in the same space to 179, representing a significant loss in power. There are also sizable regions 2010, 2020, 2030, 2040 devoid of transducers, which imply a loss of fidelity in the above acoustic volume. While this could be used as a starting point for further manual intervention in the placement of the transducer elements, this would be time consuming and would risk inadvertently compromising the optimal layout intended.

2. Physical Constraint Optimization

Transducer layout design may be better optimized for physical constraints through the use of a simulation of two-dimensional physics. Each electrical component in the simulation is comprised of multiple layers. In each layer, an object interacts with other physical bodies that reside on the same layer. For example, a transducer body may be modeled as a primitive shape on one layer. A different but rigidly-connected shape on a separate layer represents the electrical pins connection beneath the transducer. In the above example, the transducer bodies interact with each other and with the edges of the printed circuit board. In contrast, the shapes that model the transducer pins interact only with the physical board connectors to ensure there is enough space to physically place the connector. Thus, the location of the component as a whole is optimized using the simulation of a physical process.

3. Simulation Behaviors that Enhance Design

A simulator (whether in hardware, software or both) configured to provide a physical simulation of such a constrained system may be used to provide an intuitive design tool for transducer placement tasks. The challenge is that the fulfillment of positive constraints is required in the face of a desired placement of components which violates negative constraints. Such an approach yields readily intuited results satisfying these constraints while attempting to give the closest placement to the ideal of any given component. The end goal of this effort is to design and deliver an efficient real-world layout of transducers on a circuit board.

The physical process may be envisioned as, for example, a repulsive force field between elements that spreads the components evenly and/or each component represented as a rigid body. These elements may be connected to their preferred locations by constraints that correspond to an interpretation of physical springs. In this way, the physical configuration in which the "springs", positive constraints, are most relaxed while continuing to obey other physical negative constraints such as shape occlusion provides a comprehensive metaphor for component placement on a circuit board.

A rigid body simulation is one example of a physical simulation system that can be configured to yield metaphors for these constraints. The simulation of each component as a rigid body then prevents shape occlusion, as two rigid bodies may not occupy the same space at the same time. The simulator may also be used to apply a restraining force to each component in the design. This is intended to keep the components as close to the pre-calculated and ideal positions as possible. Deviation from the ideal positions results in an increased restoring force. This may be envisioned and modeled as a spring pulling the component towards the ideal location. At a predefined point, the spring may be configured to break, resulting in the deletion and possible relocation of the component.

Once the initial placement of the components, which may be automated, is complete the simulation is moved forward in time. As the simulation moves forwards in time, springs will constrict, which may pull components into better positions, while other constraints may push components away from their various preferred locations. Over time, the actions of these opposing forces will allow the board design to settle into a more optimized configuration that can be exported from the process. This may be repeated multiple times, or as a single step in a longer design process in order to obtain an effective circuit board design.

FIG. 21 shows a left layout 2100 with an initial arrangement of initial transducer placements 2112, 2114, 2116 overlaid over simulated final transducer placements 2111, 2113, 2115. In the center layout 2120, a rectangular component-free zone 2121 forces the transducers apart from their initial transducer placements 2112, 2114, 2116 and forces the simulated final transducer placements 2111, 2113, 2115 to move locations. The connection between the initial transducer placements 2112, 2114, 2116 and the simulated final transducer placements 2111, 2113, 2115 are modeled using respective springs 2122, 2123, 2124.

In the right layout 2130, the left-most transducer 2115 is removed because the expanded rectangular component-free zone 2132 forces the distance from the leftmost initial transducer placement 2116 to the simulated final transducer placement 2115 to be too large. This causes the spring to break 2131 and thus the simulated final transducer placement 2115 is removed from the layout.

FIG. 22 shows a similar situation with the difference that the "offending" transducer is moved within the array rather than removed entirely. The left layout 2210 shows five simulated final transducer placements 2211, 2212, 2213, 2214, 2215 without a component-free zone (the initial transducer placements are not shown). The center layout 2220 shows the effect of a component-free zone 2235 on transducer placement. Here, the connection between four initial transducer placements 2221, 2223, 2224, 2225 and the simulated final transducer placements 2211, 2213, 2214, 2215 are modeled using respective springs 2226, 2227, 2230, 2229. The movement of these four transducers is necessitated by the component-free zone 2235. The movement of the middle-left transducer 2212 necessitated by the component-free zone 2235 is too far, thus breaking spring 2228. This motivates moving the middle-left transducer to a position 2222 on the other side of the array.

As shown in the right layout 2240, the former middle-left transducer 2212 is moved to position 2222 on the other side of the array and a spring 2231 is used to model its placement with respect to the component free zone 2235. The rest of the elements in the right layout 2240 are the same as the center layout 2220.

Figure 23:
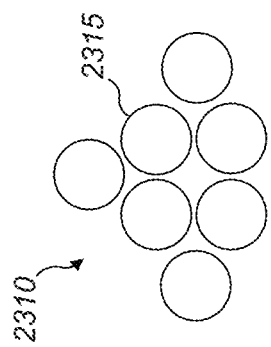
Figure 23:
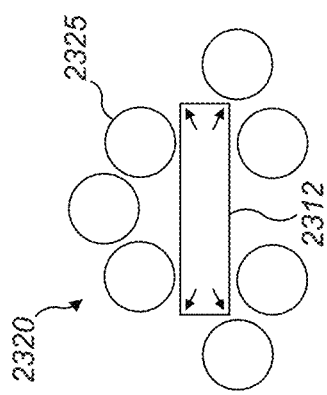
Figure 23:
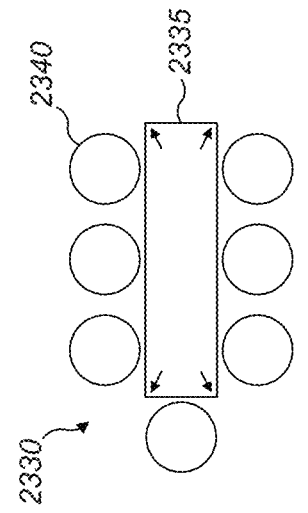

Abruptly applying constraints to the component layout may create uncertainty due to physical constraints being immediately and sharply violated. To alleviate this, constraints and components may be made to move and expand slowly into position. This physical interpretation allows components to slowly adopt a position as a natural result of the simulation. FIG. 23 shows in a left layout 2310 showing an initial transducer arrangement 2315. In the center layout 2320, a small component-free zone 2312 is shown that forces the transducer arrangement 2325 to be somewhat realigned. In the right layout 2330, an expanded component-free zone 2335 is shown that forces the transducer arrangement 2340 to be significantly realigned.

Figure 24:
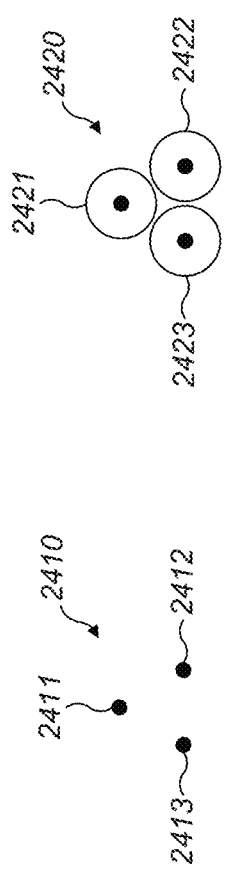
Figure 24:
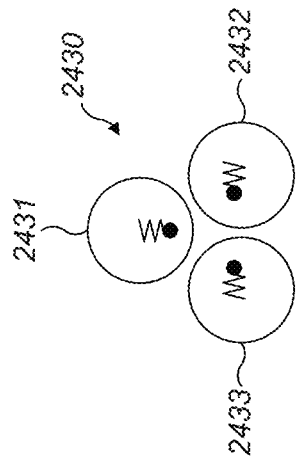

FIG. 24 shows a left layout 2410 with small components 2411, 2412, 2413. In the center layout 2420 there are expanded components 2421, 2422, 2423. In the right layout 2430 the final size components 2431, 2432, 2433 naturally arrange themselves using spring constraints.

The simulation may also be interactive by allowing for the dynamic creation and deletion of components. These components are also physically simulated and this interactivity enables an element of human control over the placement process. In these cases, both the immediate component position and the anchoring location of its associated spring constraint may be modified.

FIG. 25 shows a left layout 2510 with a set of components 2514 where a new component is being added by user input 2512. The center layout 2520 shows the initial new component 2522 being created within the other components 2524 that have moved to accommodate. The right layout 2530 shows the new layout of all components 2534.

FIG. 26 shows a left layout 2610 with a set of components 2614 where a new component is being removed by user input 2612. The center layout 2620 shows the to-be-removed component 2622 being removed among the other components 2624. The right layout 2630 shows the layout of the remaining components 2634.

Figure 27:
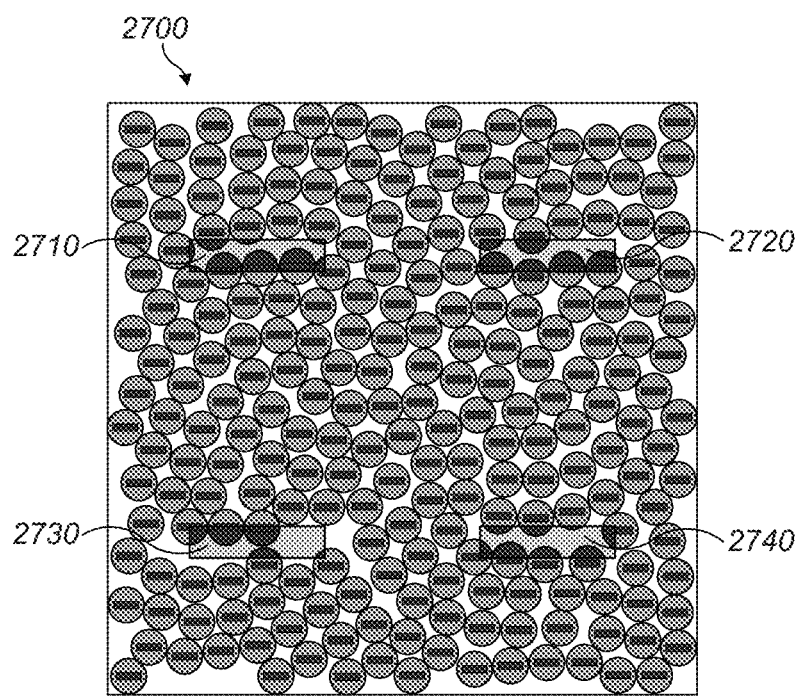
FIG. 27 shows an improved attempt to duplicate the layout of FIG. 19 in a real-world situation.

An example of a layout improved using the foregoing methods is shown in FIG. 27. The component layout 2700 results in a total component count of 237 compared to 179 components in FIG. 20 above. As a result of the more efficient layout, regions 2710, 2720, 2730, 2740 are no longer empty but include numerous components.

III. CALIBRATION OF ARRAYS USING LEVITATING FIDUCIALS

1. Levitation as an Input Calibration Step

The levitation of objects such as polystyrene beads, is possible using the acoustic field produced above the array. It has been shown that an optimization may be employed to generate a levitation point at which a small object can be trapped. (Marzo et al., Holographic acoustic elements for manipulation of levitated objects, Nature Communications 6:8661 (2015)). A levitation point may be created in a manner similar to a control point and at a predictable sub-wavelength offset from an equivalent control point that can be created at the same position. The object can then be sensed using the same sensor as the input, which could for example be a camera. This object may be then used as a fiducial marker floating in free space. This fiducial object may provide a correspondence between the input coordinate space of a sensing device capable of spatial tracking and the acoustic output coordinate space.

Once a bead is trapped at a levitation point, the levitation point may be slowly moved in a similar fashion to a control point. As the levitation point moves around the acoustic volume above the array, the correspondence between the acoustic output space and sensor input space is refined. In order to provide sufficient sensor calibration, the object must move through all three dimensions, registering correspondences between input and output space through time. An example path for the object might be between the vertices of a tetrahedron floating above the array. The system may be operated without human intervention if an acoustically transparent structure holds the fiducial in a predefined initial position so that the array can grip and levitate the object.

2. Levitation as an Output Calibration Step

If the correspondence between the input sensor space and the objective measurement of position is known, then the levitating object may be used to calibrate the output space of the array. As the formation of a levitation point is similar to the formation of a control point, the former may be used to measure the way in which the acoustic assumptions hold across the acoustic volume. This may be used to ascertain whether the positions to which the array focuses are correct and enable the computation of a correction factor in the event that the focus has been linearly or non-linearly transformed in space. Both the input and the output calibration steps may be performed at the same time.

V. CONCLUSION

The various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus comprising:
   a transducer array having a plurality of transducers with known relative positions and orientations to generate a mid-air acoustic field;
   a plurality of control points, wherein each of the plurality of control points has a known spatial relationship relative to the transducer array;
   wherein the plurality of transducers generate the mid-air acoustic field at desired amplitudes at the plurality of control points;
   wherein at least a portion of the plurality of transducers is arranged in a partial phyllotactic spiral pattern and wherein the partial phyllotactic spiral pattern minimizes erroneous local maxima in the mid-air acoustic field;
   wherein the distribution of the plurality of transducers in the partial phyllotactic spiral pattern is of approximately uniform density; and wherein the distribution of the plurality of transducers in the partial phyllotactic spiral pattern is based on the angular proportions of an irrational number.

2. The apparatus as in claim 1, wherein the transducer array is arranged in a rectilinear format.

3. The apparatus as in claim 1, wherein the transducer array is arranged in a frame format.

4. The apparatus as in claim 1, wherein the plurality of transducers includes a first transducer having a first orientation and a second transducer having a second orientation, and wherein the first orientation is not equal to the second orientation.

5. The apparatus as in claim 4, wherein the differential between the first orientation and the second orientation is approximately 90 degrees.

6. The apparatus as in claim 1, wherein at least one of the plurality of transducers is directed toward a pre-determined point within the mid-air acoustic field.

7. The apparatus as in claim 1, wherein the irrational number has a value of approximately 0.618.

8. The apparatus as in claim 1, wherein the distribution of the plurality of transducers in the partial phyllotactic spiral pattern is sparser toward the edges of the partial phyllotactic spiral pattern.

9. An apparatus comprising:
a transducer array having a plurality of transducers with known relative positions and orientations to generate a mid-air acoustic field;
a plurality of levitation points, wherein the plurality of transducers generate the mid-air acoustic field at desired amplitudes at the plurality of levitation points and wherein the plurality of levitation points have an acoustic output coordinate space;
at least one mid-air fiducial marker floating near at least one of the plurality of levitation points;
a sensing device for locating at least one of the levitation points within the mid-air acoustic field, wherein the sensing device has an input coordinate space; and
a calibrator for calibrating the sensing device based on tracking the position of the at least one of the mid-air fiducial markers within the mid-air acoustic field;
wherein the at least one fiducial marker provides a correspondence between the input coordinate space and the acoustic output coordinate space.

10. The apparatus as in claim 9 wherein tracking the position of the at least one of the mid-air fiducial markers within the mid-air acoustic field comprises movement of the at least one of the mid-air fiducial markers in three dimensions.

* * * * *